(12) United States Patent
Lee et al.

(10) Patent No.: US 6,184,163 B1
(45) Date of Patent: *Feb. 6, 2001

(54) DIELECTRIC COMPOSITION FOR PLASMA DISPLAY PANEL

(75) Inventors: Yoon Kwan Lee, Kyungki-do; Byung Gil Ryu, Seoul, both of (KR)

(73) Assignee: LG Electronics Inc., Seoul (KR)

( * ) Notice: Under 35 U.S.C. 154(b), the term of this patent shall be extended for 0 days.

This patent is subject to a terminal disclaimer.

(21) Appl. No.: 09/209,240

(22) Filed: Dec. 10, 1998

(30) Foreign Application Priority Data

Mar. 26, 1998 (KR) ................................................. 98-10614
Apr. 10, 1998 (KR) ................................................. 98-12928

(51) Int. Cl.[7] ........................... C03C 3/066; C03C 3/074; C03C 14/00
(52) U.S. Cl. ................................ 501/32; 501/76; 501/79; 313/586
(58) Field of Search ................................ 501/17, 18, 22, 501/26, 32, 76, 79; 313/586

(56) References Cited

U.S. PATENT DOCUMENTS

| 4,409,292 | * | 10/1983 | Parant | 501/76 |
|---|---|---|---|---|
| 4,451,761 | * | 5/1984 | Kay | 313/586 |
| 4,578,619 | * | 3/1986 | Braude | 501/15 |
| 4,624,934 | * | 11/1986 | Kokubu et al. | 501/26 |
| 5,264,758 | * | 11/1993 | Iijima et al. | 313/584 |
| 5,674,634 | * | 10/1997 | Wang et al. | 428/688 |
| 6,004,894 | * | 12/1999 | Faust et al. | 501/17 |
| 6,010,973 | * | 1/2000 | Watanabe et al. | 501/20 |
| 6,046,121 | * | 4/2000 | Masuko et al. | 501/20 |

FOREIGN PATENT DOCUMENTS

| 8-119665 | * | 5/1996 | (JP) . |
| 9-278482 | * | 10/1997 | (JP) . |
| 10-112265 | * | 4/1998 | (JP) . |
| 10-208644 | * | 8/1998 | (JP) . |

OTHER PUBLICATIONS

Kingery et al., Introduction to Ceramics, 1976, p. 595.*

* cited by examiner

Primary Examiner—Mark L. Bell
Assistant Examiner—David Sample
(74) Attorney, Agent, or Firm—Fleshner & Kim, LLP

(57) ABSTRACT

A dielectric composition for a plasma display panel. In the dielectric composition, a $SiO_3$—$ZnO$—$B_2O_3$ group glass is used. Accordingly, the dielectric composition is capable of meeting optical, thermal and electrical characteristic requirements of a dielectric layer and allows the dielectric layer to have a light weight.

11 Claims, 5 Drawing Sheets

FIG.1
RELATED ART
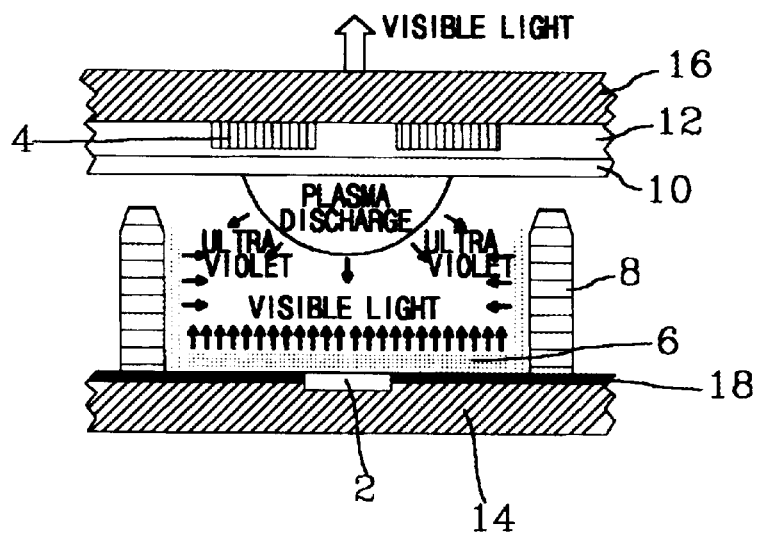
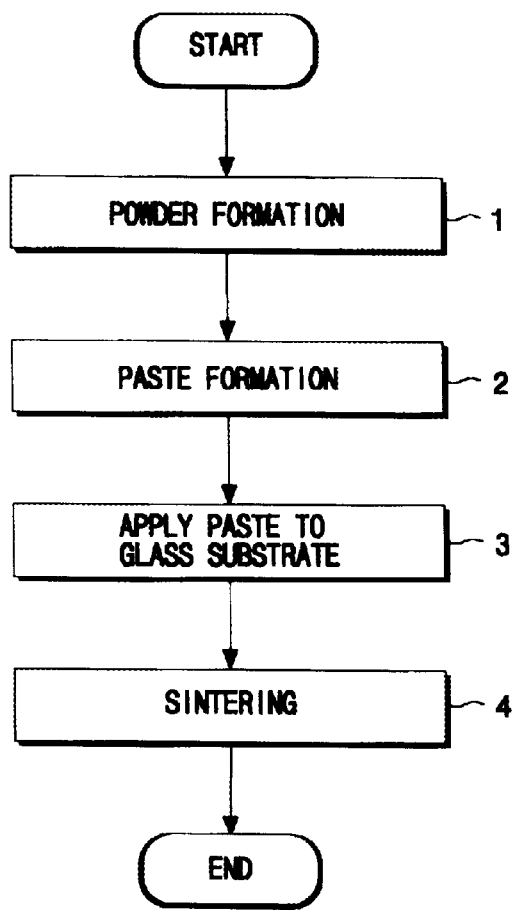
FIG.2

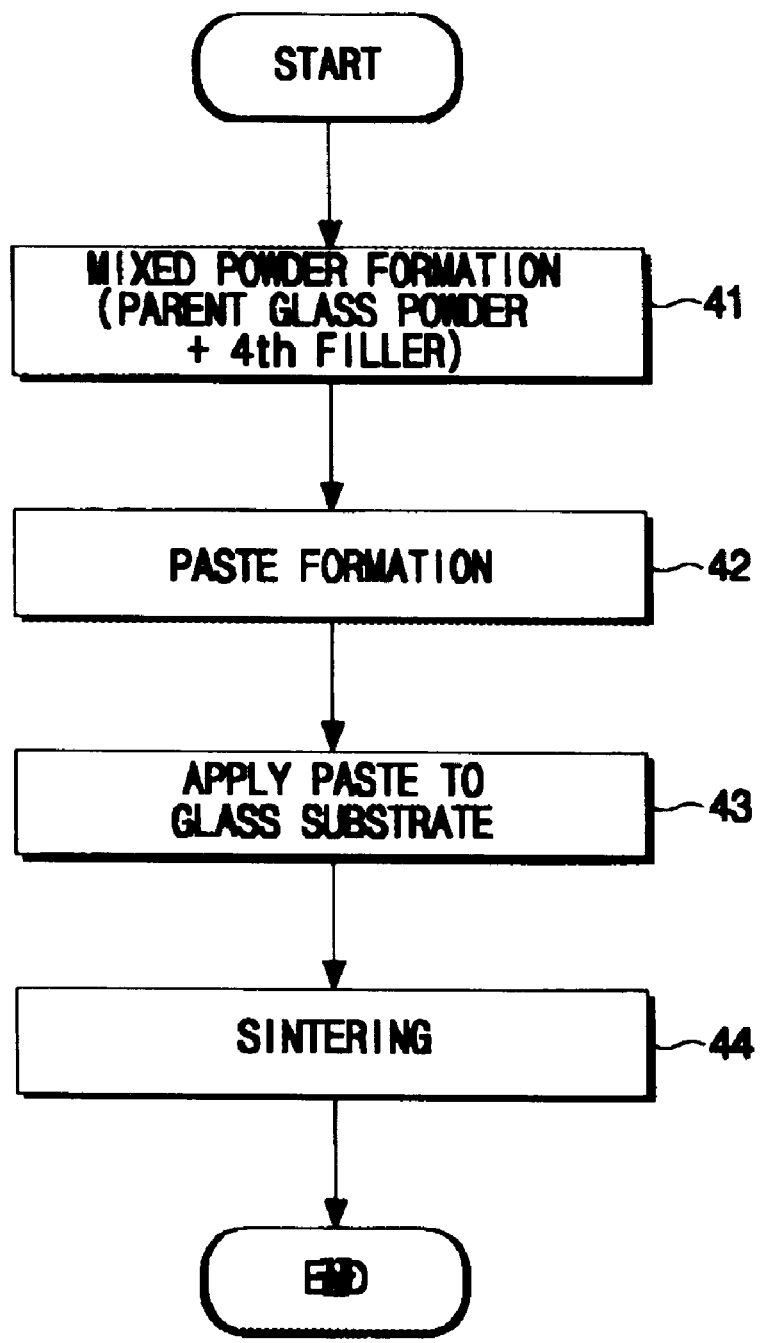

DIELECTRIC COMPOSITION FOR PLASMA DISPLAY PANEL

BACKGROUND OF THE INVENTION

1. Field of the Invention

This invention relates to a composition of dielectric for a plasma display panel.

2. Description of the Related Art

Nowadays, there have been actively developed flat display devices such as a liquid crystal display (LCD), a field emission display(FED), a plasma display panel (PDP) and so on. In the flat display devices, the PDP has advantages in that it permits an easier manufacturing according to its simple structure, and a higher efficiency in the brightness and emission in comparison to other flat display devices. Further, the PDP has advantages in that it has not only a memory function, a light view angle more than 160°, but also it permits an implementation of a large-scale screen more than 40 inches.

Referring to FIG. 1, there is shown a conventional PDP that includes a lower glass substrate 14 mounted with an address electrode 2, a lower dielectric layer 18 applied on the lower glass substrate 14 in a predetermined thickness to form a wall charge, barrier ribs 8 defined on the lower dielectric layer 18 to divide each discharging cell, a fluorescent layer 6 excited and radiated by a light generated during the plasma discharge, a transparent electrode 4 defined on the upper glass substrate 16, an upper dielectric layer 12 applied on the upper glass substrate 16 and the transparent electrode 4 in a predetermined thickness to form a wall charge, and a protective layer 10 applied on the upper dielectric layer 12 to protect the upper dielectric layer 12 from any sputtering due to the discharge. If a predetermined voltage(e.g., 200 V) is applied to the address electrode 2 and the transparent electrode 4, then a plasma discharge is generated in the inner side of the discharging cell by means of electrons emitted from the address electrode 2. More specifically, electrons emitted from the electrode 2 collides with atoms in a mixed gas of He gas and Xe gas or a mixed gas of Ne gas and Xe gas sealed in the discharging cell and ionizes the atoms in the mixed gas, thereby causing an emission of secondary electrons. The secondary electrons repeat a collision with the atoms in the mixed gas to thereby ionize the mixed gas atoms sequentially. In other words, they enter an avalanche process having electrons and ions increased into twice. A light generated in the avalanche process radiates the fluorescent layer of red(R), green(G), and blue(B) colors. The R, G and B lights emitted at the fluorescent layer progress, via the protective layer 10, the upper dielectric layer 12 and the transparent electrode 4, into the upper glass substrate 16 so as to display an image. It is necessary for the upper dielectric layer 12 and the lower dielectric layer 18 to have a characteristic different from each other. For example, the upper dielectric layer 12 requires to have a high transmission coefficient because it must transmit a light radiated from the fluorescent layer 6; whereas the lower dielectric layer 18 not only requires to have a high density structure and a high reflection coefficient because it must perform functions of improving a radiation efficiency as well as preventing a diffusion by reflecting the light radiated from the fluorescent layer 6 toward the upper glass substrate 16, but also it requires to have characteristics of a low thermal expansion coefficient, a thermal stability and a low dielectric constant and so on so as to prevent a crack.

A dielectric layer and a method thereof for meeting the requirements as mentioned above were disclosed in the Japanese patent publication No. 8-119665. The dielectric layer in the above Japanese patent publication No. 8-119665 has a composition as shown in Table 1. The composition ratio in Table 1 was given assuming a weight of dielectric layer to be 100 weight percent.

TABLE 1

| | Composition of dielectric layer | | | | |
|---|---|---|---|---|---|
| COMPONENT | PbO | $SiO_2$ | $B_2O_3$ | ZnO | $Al_2O_3$ |
| WEIGHT % | 60–70 | 12–17 | 8–15 | 5–12 | 0.1–5 |

An alternative method of manufacturing the dielectric layer is disclosed in the Japanese Patent Publication No. 8-119665. In the method, first, a compound glass including PbO of 60 to 70 weight % or a glass-ceramics material mixing an oxide filler with the compound glass is prepared into a powder below 10 μm. Subsequently, the powder is pasted into a state mixed with an organic vehicle and then the pasted powder is screen printed on the glass substrate into a thickness of 20 to 30 μm. Finally, the paste screen-printed on the glass substrate is dried for 20 to 30 minutes at a temperature of 100° C. and thereafter is sintered at a temperature range of 500 to 550° C., thereby making a dielectric layer.

The dielectric layer manufactured in a manner as described above has problems in that it causes a delay phenomenon in an addressing time because its dielectric constant has a relatively high value of 12 to 15 and that it causes an increase in a weight of devices and the entire weight because the gravity of Pb is heavy. Another problem is glass that the glass containing PbO causes pollution.

SUMMARY OF THE INVENTION

Accordingly, it is an object of the present invention to provide a dielectric composition for a plasma display panel that is capable of meeting optical, thermal and electrical characteristic requirements.

Further object of the present invention is to provide a dielectric composition for a plasma display panel without Pbo causing pollution.

In order to achieve these and other objects of the invention, according to one aspect of the present invention, a glass of $SiO_2$—ZnO—$B_2O_3$ group is used for a dielectric composition for a plasma display panel.

According to another aspect of the present invention, a glass of $P_2O_5$—ZnO—BaO group is used for a dielectric composition for a plasma display panel.

According to still another aspect of the present invention, a dielectric composition for a plasma display panel includes a glass of $SiO_2$—ZnO—$B_2O_3$ group, and a filler having a melting point below 580° C.

According to still another aspect of the present invention, a dielectric composition for a plasma display panel includes a glass of $SiO_2$—ZnO—$B_2O_3$ group, a first filler having a refraction index above 2, a thermal expansive coefficient of $80 \times 10^{-7}$/° C. and a melting point above 800° C., and a second filler having a melting point below 580° C.

According to still another aspect of the present invention, a dielectric composition for a plasma display panel includes a glass of $SiO_2$—ZnO—$B_2O_3$ group, and a filler of oxide powder.

According to still another aspect of the present invention, a dielectric composition for a plasma display panel includes a glass of $P_2O_5$—ZnO—BaO group and a filler of oxide powder.

BRIEF DESCRIPTION OF THE DRAWINGS

These and other objects of the invention will be apparent from the following detailed description of the embodiments of the present invention with reference to the accompanying drawings, in which:

FIG. 1 is a schematic view showing the structure of a conventional plasma display panel;

FIG. 2 is a flow chart showing a manufacturing method of a dielectric layer for the purpose of explaining a dielectric composition for a plasma display panel according to a first embodiment of the present invention;

FIG. 6 is a flow chart showing a manufacturing method of a dielectric layer for the purpose of explaining a dielectric composition for a plasma display panel according to a fifth embodiment of the present invention.

DETAILED DESCRIPTION OF THE PREFERRED EMBODIMENT

Figure 3:
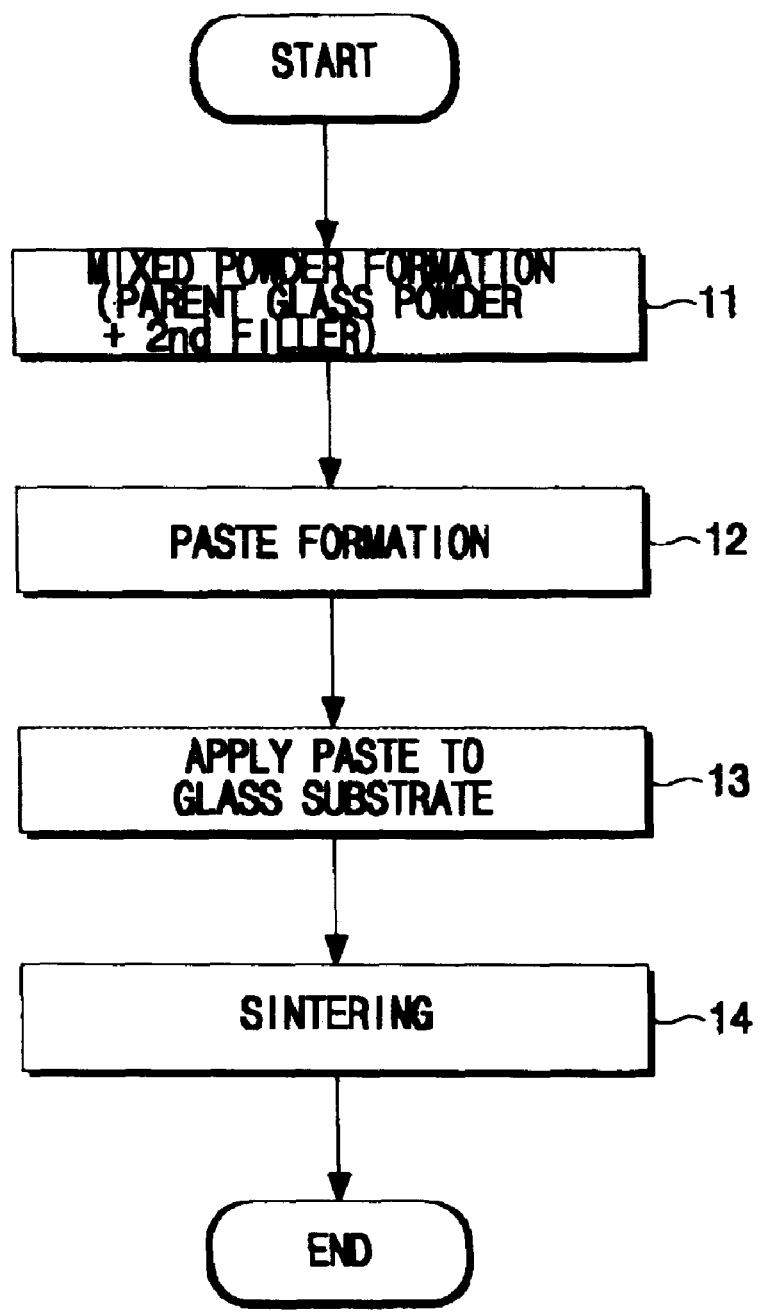
FIG. 3 is a flow chart showing a manufacturing method of a dielectric layer for the purpose of explaining a dielectric composition for a plasma display panel according to a second embodiment of the present invention.

Preferred embodiments of the present invention will be explained with reference to FIG. 2 to FIG. 6. A dielectric layer according to the present invention is formed of a glass powder of $SiO_2$—$ZnO$—$B_2O_3$ group or $P_2O_5$—$ZnO$—$BaO$ group, a composition mixing the glass powder of $SiO_2$—$ZnO$—$B_2O_3$ group with a filler (i.e., any one of the first to third fillers) powder, or a composition mixing the glass powder of $P_2O_5$—$ZnO$—$BaO$ group with a filler (i.e., the fourth filler). In a manufacturing method of such a dielectric layer, a raw material according to a characteristic requirement of the dielectric layer is mixed at a desired composition ratio and melted and then cooled suddenly, thereby preparing a powder(i.e., the glass powder) of a fine-grain particle or powder or a mixture powder mixing the powder with a filler at a desired ratio. The powder(i.e., the glass powder) or the mixture powder is mixed with an organic vehicle at a desired ratio to thereby make it a paste state. Next, the paste is applied on a glass substrate into a desired thickness and then sintered at a desired temperature, thereby making the dielectric layer. The dielectric layer manufactured in this manner has improved optical, thermal and electrical characteristics.

Hereinafter, a composition of a dielectric layer and a manufacturing method thereof according to embodiments of the present invention will be explained below. However, it is to be noted that a scope of the present invention should not be limited by the embodiments.

First Embodiment

In the first embodiment of the present invention, a dielectric layer formed of a glass powder of $SiO_2$—$ZnO$—$B_2O_3$ group or a glass powder of $P_2O_5$—$ZnO$—$BaO$ group is used. The following Table 2 and Table 3 show composition ratios of a glass powder of $SiO_2$—$ZnO$—$B_2O_3$ group or a glass powder of $P_2O_5$—$ZnO$—$BaO$ group, respectively. A composition in Table 2 is given assuming the weight of a $SiO_2$—$ZnO$—$B_2O_3$ group glass to be 100 weight percent.

TABLE 2

Composition of the glass of $SiO_2$—$ZnO$—$B_2O_3$ group

| COMPONENT | $SiO_2$ | $K_2O$ | $Li_2O$ | $Na_2O$ | PbO | CaO | ZnO | $B_2O_3$ | $Al_2O_3$ |
|---|---|---|---|---|---|---|---|---|---|
| WEIGHT % | 15–25 | 2–10 | 1–5 | 2–8 | 3–40 | 1–5 | 25–45 | 12–25 | 1–7 |

A composition in Table 3 is given assuming the weight of a $P_2O_5$—$ZnO$—$BaO$ group glass to be 100 weight percent.

TABLE 3

Composition of the glass of $P_2O_5$—$ZnO$—$BaO$ group

| COMPONENT | $P_2O_5$ | ZnO | $Li_2O$ | CaO | BaO | $B_2O_3$ | $Al_2O_3$ |
|---|---|---|---|---|---|---|---|
| WEIGHT % | 45–65 | 20–35 | 2–10 | 1–6 | 3–15 | 1–5 | 1–7 |

Referring to FIG. 2, there are explained a method for manufacturing a dielectric layer for a plasma display panel according to the first embodiment of the present invention step by step. In step 1, a glass powder is prepared. More specifically, first, a row material of a $SiO_2$—$ZnO$—$B_2O_3$ group glass or a $P_2O_5$—$ZnO$—$BaO$ group glass is mixed at a component ratio in Table 2 or Table 3. The row material has a different component ratio as seen from Table 2 and Table 3, depending upon whether it is the $SiO_2$—$ZnO$—$B_2O_3$ group glass or the $P_2O_5$—$ZnO$—$BaO$ group glass. With reference to Table 2, the $SiO_2$—$ZnO$—$B_2O_3$ group glass includes ZnO of 25 to 45 weight %, PbO of 3 to 40 weight %, $SiO_2$ of 15 to 25 weight %, $B_2O_3$ of 12 to 25 weight %, $K_2O$ of 2 to 10 weight %, $Na_2O$ of 2 to 8 weight %, $Al_2O_3$ of 1 to 7 weight %, $Li_2O$ of 1 to 5 weight %, and CaO of 1 to 5 weight %, With reference to Table 3, the $P_2O_5$—$ZnO$—$BaO$ group glass includes $P_2O_5$ of 45 to 65 weight %, ZnO of 20 to 35 weight %, BaO of 3 to 15 weight %, $Li_2O$ of 2 to 10 weight %, $Al_2O_3$ of 1 to 7 weight %, CaO of 1 to 6 weight %, and $B_2O_3$ of 1 to 5 weight %. The $SiO_2$—$ZnO$—$B_2O_3$ group glass or the $P_2O_5$—$Zn$—$BaO$ group glass is prepared at the above-mentioned component ratio and the prepared material is mixed by means of a tumbling mixer driven for a desired time(e.g., 10 hours). Second, the mixed raw material is melted by putting it into a melting furnace. At this time, the melting condition is kept for about 5 hours at a temperature of 1100° C. Also, the raw material is stirred two or three times so that it can be uniformly melted in the course of melting, and thus the melted glass has a delicate organization. Third, a power having fine-grain particles is made by providing a sudden cooling of a the melted glass. The melted glass passes through a quenching roller and, thereafter, is cooled suddenly, thereby producing glass cullets having minute cracks. The glass cullets are milled for a desired time(e.g., 16 hours) by the ball milling technique and thereafter passes through # 170 and # 270 sievers sequentially, thereby making a powder having a particle size of about 6 μm. In this case, a quenching roller system is desirable for a production of the cullets and a cylindrical type of ball is preferably used in the milling works. The $SiO_2$—$ZnO$—$B_2O_3$ group glass powder or the $P_2O_5$—$ZnO$—$BaO$ group glass powder is made by the process as mentioned above. A composition made from the $SiO_2$—$ZnO$—$B_2O_3$ group glass powder or the $P_2O_5$—$ZnO$—$BaO$ group glass powder is applicable to the upper dielectric layer.

In step 2, a powder paste is prepared by mixing the powder with an organic vehicle at a desired ratio. More specifically, the powder is mixed with an organic vehicle at a predetermined ratio to form a paste. Herein, a mixture of butyl-carbitol-acetate(BCA), butyl-carbitol(BC) and ethyl-cellulose(EC) with the organic vehicle at a desired ratio is used as the organic vehicle. Since a viscosity of the paste is varied in accordance with a quantity of EC to influence the rheology and sintering characteristic, EC having a mixing ratio of 10% is preferably used. Also, BCA having a mixing ratio of 60% and BC having a mixing ratio of 30% are preferably used.

Subsequently, the paste is printed on the glass substrate in step 3 and then is sintered for a desired time at a desired temperature in step 4. More specifically, the paste is applied on the glass substrate into a thickness of 10 μm by the screen printing method and then dried for a desired time(e.g., 20 minutes) at a dry oven, and thereafter the glass substrate is put into a resistor heating furnace of batch or in-line type. The glass substrate entered in this manner is sintered in accordance with a crystallization temperature to thereby form a dielectric layer. At this time, an organic material included in the paste is eliminated from the dry oven. The sintering temperature is defined by the crystallization temperature from the differential thermal analysis(DTA) as to the powder. It is desirable to sinter the glass substrate for about 15 to 30 minutes at a temperature of 500 to 600° C. in the case of $SiO_2$—$ZnO$—$BO_3$ group and at a temperature of 510 to 530° C. in the case of $P_2O_5$—$ZnO$—$BaO$ group. The dielectric layer formed in a manner as described above does not include PbO so that its weight becomes light.

Second Embodiment

In the second embodiment of the present invention, a dielectric layer is formed by mixing a glass powder of $SiO_2$—$ZnO$—$B_2O_3$ group or a glass powder of $P_2O_5$—$ZnO$—$BaO$ group with a second filler powder having a melting point below 580° C. The above Table 2 and the following Table 4 show a composition ratio of a glass powder of $SiO_2$—$ZnO$—$B_2O_3$ group and a type and characteristic of the second filler powder, respectively. A composition in Table 4 is given assuming the weight of a $SiO_2$—$ZnO$—$B_2O_3$ group glass to be 100 weight percent.

TABLE 4

Type and Component ratio of the second filler powder

| TYPE | $B_2O_3$ | $NaNO_3$ | LiI | $LiNO_3$ | $CaI_2$ | $KIO_3$ | $KNO_3$ |
|---|---|---|---|---|---|---|---|
| MELTING POINT (° C.) | 460 | 308 | 446 | 255 | 575 | 560 | 339 |
| COMPONENT (WEIGHT %) | | | | 1–20 | | | |

In this embodiment, an oxide powder having a melting point below 580° C. is used as the second filler. For example, LiI, $LiNO_3$, NaNO, and $KIO_3$ including Li, Na and K belonging to 1A group(i.e., elements having a single balance electron) in the periodic table are replaced by bridging oxygen ions of a glass molecule(i.e., a molecule having four balance electrons) to form a non-bridging oxygen. Such a non-bridging oxygen separates a continuous reticulated structure of the glass to reduce a sintering temperature of the glass. Also, $B_2O_3$ including B belonging to 3A group(i.e., elements having three balance electrons) in the periodic table is replaced by bridging oxygen ions of a glass molecule (i.e., a molecule having four balance electrons) to form a non-bridging oxygen. Such a non-bridging oxygen separate a continuous reticulated structure of the glass to reduce a sintering temperature of the glass. Owing to this, the second filler prevents a thermal deformation of the dielectric layer and the substrate When the sintering temperature is high, a deformation of a soda-lime glass used as the substrate occurs. On the other hand, when the sintering temperature is too low, an air perforation is left due to an incomplete disposition of the dielectric layer to thereby cause a deterioration in a reflectivity and a surface luminance as well as a characteristic deterioration such as a reduction in a thermal stability and so on. Accordingly, a sintering temperature range of the dielectric layer is preferably 500 to 580° C. To this end, the second filler having a melting point below 580° C. is used to lower an activation energy and cause a expedition of reaction according to an increase in a fluidity so as to permits a sufficient sintering below 580° C.

Referring now to FIG. 3, there are explained a method for manufacturing a dielectric layer for a plasma display panel according to the second embodiment of the present invention step by step. In step 11, the second filler powder(i.e., the oxide powder) is mixed with the $SiO_2$—$ZnO$—$B_2O_3$ group glass powder to form a mixed powder. More specifically, the $SiO_2$—$ZnO$—$B_2O_3$ group glass powder is prepared in the same manner as explained with reference to FIG. 2. Then, the second filler powder having a component ratio in Table 4 is mixed with the $SiO_2$—$ZnO$—$B_2O_3$ group glass powder to form a mixed powder. A mixed powder composition made by mixing the $SiO_2$—$ZnO$—$B_2O_3$ group glass powder with the second filler powder is applicable to the lower dielectric layer and the barrier rib or separator.

In step 12, a paste is prepared by mixing the mixed powder with an organic vehicle at a desired ratio. Herein, the mixed powder means a mixture of the $SiO_2$—$ZnO$—$B_2O_3$ group glass powder and the second filler powder. An explanation as to the process of forming the paste is omitted because it has already been done with reference to FIG. 2.

Subsequently, the paste is printed on the glass substrate in step 13 and then is sintered for a desired time at a desired temperature in step 14. An explanation as to the printing and sintering process is omitted because it has already been done with reference to FIG. 2.

The dielectric layer formed in a manner as described above include a slight quantity of PbO, so that its weight becomes light. Also, the second filler is mixed to lower the sintering temperate, thereby preventing a deformation of the dielectric layer and the substrate.

Third Embodiment

In the third embodiment of the present invention, a dielectric layer is formed by mixing a glass powder of $SiO_2$—$ZnO$—$B_2O_3$ group with the first and second filler powder(i.e., Oxide powder). The following Table 5 shows a composition ratio of the first filler powder. A composition in Table 5 is given assuming the weight of a $SiO_2$—$ZnO$—$B_2O_3$ group glass to be 100 weight percent.

TABLE 5

Type and Component ratio of the first filler powder

| FILLER TYPE | MELTING POINT (° C.) | REFRACTION INDEX (n) | COMPONENT (WEIGHT %) |
|---|---|---|---|
| $TiO_2$ | 1640 | 2.76 | 4–30 |
| $ZrO_2$ | 2720 | 2.20 | |
| SiC | 2700 | 2.68 | |
| Si | 1410 | 3.49 | |
| $BaTiO_3$ | 1620 | 2.40 | |
| $CaTiO_3$ | — | 2.35 | |
| $LiNbO_3$ | — | 2.31 | |
| NiO | 1990 | 2.27 | |
| MnO | 1650 | 2.16 | |
| ZnO | 1970 | 2.0 | |
| $Bi_2O_3$ | 817 | 2.6 | |
| $SiO_2$ | — | 2.15 | |

In this embodiment, an oxide powder having a refraction index(n) above 2.0, a thermal expansive coefficient of $80 \times 10^{-7}/°$ C. and a melting point below 800° C. is used as the first filler. For example, if $TiO_2$ of 4 to 30 weight % is mixed with the glass, then a reflectivity and a crystallinity of the lower dielectric layer 18 is improved. More specifically, a refraction index(n) of the glass is 1.4 to 1.5 and a refraction index(n) of $TiO_2$ is 2.76. At this time, since the refraction index is directly proportional to the reflectivity, the reflectivity is more and more increased as the refraction index becomes higher. Also, the reflectivity is increased because $TiO_2$ heighten a crystallinity of the dielectric layer. Furthermore, if $ZrO_2$ of 4 to 30 weight % is mixed with the glass, then a crystallinity of the dielectric layer is improved. The dielectric layer may be formed by selectively adding at least one of $TiO_2$, $ZrO_2$, SiC, Si, $BaTiO_3$, $CaTiO_3$, $LiNbO_3$, NiO, MnO, ZnO, $Bi_2O_3$ and $SiO_2$ depending on the characteristics required for the dielectric layer. Accordingly, the first filler is mixed with the glass at a desired component ratio(e.g., 4 to 30 weight %) to thereby improve a reflectivity and a surface luminance of the dielectric layer. Also, a thermal expansive coefficient of the dielectric layer becomes approximate to that of the glass by mixing the first filler with the glass at a desired component ratio(e.g., 4 to 30 weight %), thereby preventing a crack. Herein, since the type and composition of the second filler is as same as that in Table 4, an explanation as to this is omitted.

Figure 4:
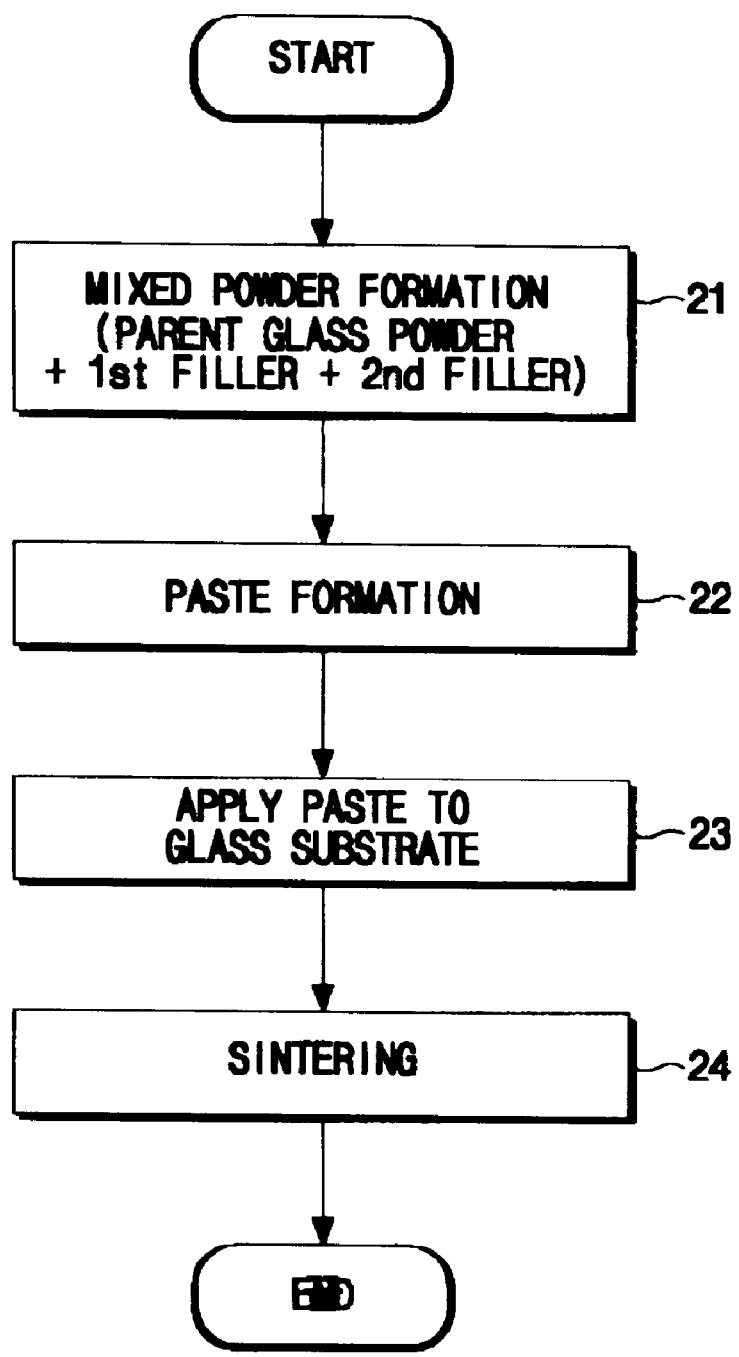
FIG. 4 is a flow chart showing a manufacturing method of a dielectric layer for the purpose of explaining a dielectric composition for a plasma display panel according to a third embodiment of the present invention.

Referring now to FIG. 4, there are explained a method for manufacturing a dielectric layer for a plasma display panel according to the third embodiment of the present invention step by step. In step 21, the first and second filler powders (i.e., the oxide powder) are mixed with the $SiO_2$—ZnO—$B_2O_3$ group glass powder to form a mixed powder. More specifically, the $SiO_2$—ZnO—$B_2O_3$ group glass powder is prepared in the same manner as explained with reference to FIG. 2. Then, the first and second filler powders having component ratios in Table 5 and Table 4, respectively, are mixed with the $SiO_2$—ZnO—$B_2O_3$ group glass powder to form a mixed powder. A mixed powder composition made by mixing the $SiO_2$—ZnO—$B_2O_3$ group glass powder with the first and second filler powder is applicable to the lower dielectric layer and the barrier rib or separator.

In step 22, a paste is prepared by mixing the mixed powder with an organic vehicle at a desired ratio. Herein, the mixed powder means a mixture of the $SiO_2$—ZnO—$B_2O_3$ group glass powder and the first and second filler powders. An explanation as to the process of forming the paste is omitted because it has already been done with reference to FIG. 2.

Subsequently, the paste is printed on the glass substrate in step 23 and then is sintered for a desired time at a desired temperature in step 24. An explanation as to the printing and sintering process is omitted because it has already been done with reference to FIG. 2.

Meanwhile, the following Table 6 represents a characteristic of the dielectric layer made by adding the first and second fillers to the $SiO_2$—ZnO—$B_{23}$ group glass in the above-mentioned manner.

TABLE 6

Characteristic of the dielectric layer made by adding the first and second fillers to the $SiO_2$-ZnO-$B_2O_3$ group glass

| | |
|---|---|
| DIELECTRIC CONSTANT (1Mhz) | 7–10 |
| RESISTING VOLTAGE (KV) | 1.5–2.0 |
| THERMAL EXPANSIVE COEFFICIENT ($10^{-7}/°$ C.) | 79–89 |
| SINTERING TEMPERATURE (° C.) | 550–580 |
| SURFACE LUMINANCE (100 $\mu$m, Å) | 2500–5000 |
| REFLECTIVITY (400 nm, %) | 50–60 |

The dielectric layer formed in a manner as described above has a relatively low dielectric constant of 7 to 10 to thereby reduce a delay of addressing time and improve a surface luminance and a reflectivity of the dielectric layer. Also, the dielectric layer includes a slight quantity of PbO, so that its weight becomes light. Further, a thermal expansive coefficient of the dielectric layer becomes approximate to that of the glass substrate by mixing the first filler with the glass to thereby prevent a crack of the dielectric layer. Moreover, the second filler is selectively mixed to lower the sintering temperate, thereby preventing a deformation of the dielectric layer and the substrate.

Fourth Embodiment

In the fourth embodiment of the present invention, a dielectric layer is formed by mixing a glass powder of $SiO_2$—ZnO—$B_2O_3$ group with the third filler powder(i.e., oxide powder). The following Table 7 shows a composition ratio of the third filler to be added to the $SiO_2$—ZnO—$B_2O_3$ group glass. A composition in Table 7 is given assuming the weight of a $SiO_2$—ZnO—$B_2O_3$ group glass to be 100 weight percent.

TABLE 7

Type and Component ratio of the third filler

| FILLER | $TiO_2$ | $AlPO_4$ | $P_2O_5$ | $V_2O_5$ | $ZrO_2$ |
|---|---|---|---|---|---|
| WEIGHT % | 3–25 | 5–30 | 5–30 | 2–15 | 2–20 |

In connection with the third filler to be mixed with the $SiO_2$—ZnO—$B_2O_3$ group glass, if $TiO_2$ of 3 to 25 weight % is mixed with the glass, then a reflectivity and a crystallinity of the dielectric layer is improved. More specifically, a refraction index(n) of the glass is 1.4 to 1.5 and a refraction index(n) of $TiO_2$ is 2.76. At this time, since the refraction index is directly proportional to the reflectivity, the reflectivity is more and more increased as the refraction index becomes higher. Also, the reflectivity is increased because $TiO_2$ heightens a crystallinity of the dielectric layer. Meanwhile, if $AlPO_4$ of 5 to 30 weight %, $P_2O_5$ of 5 to 30 weight %, $V_2O_5$ of 2 to 15 weight %, or $ZrO_2$ of 2 to 20 weight % is mixed with the glass, then a crystallinity of the lower dielectric layer 18 is improved. The dielectric layer may be formed by mixing all of $TiO_2$, $AlPO_4$, $P_2O_5$ and $ZrO_2$ with the glass. Alternatively, the dielectric layer may be formed by selectively adding at least one of $TiO_2$, $AlPO_4$, $P_2O_5$ and $ZrO_2$ depending on the characteristics required for the dielectric layer.

Figure 5:
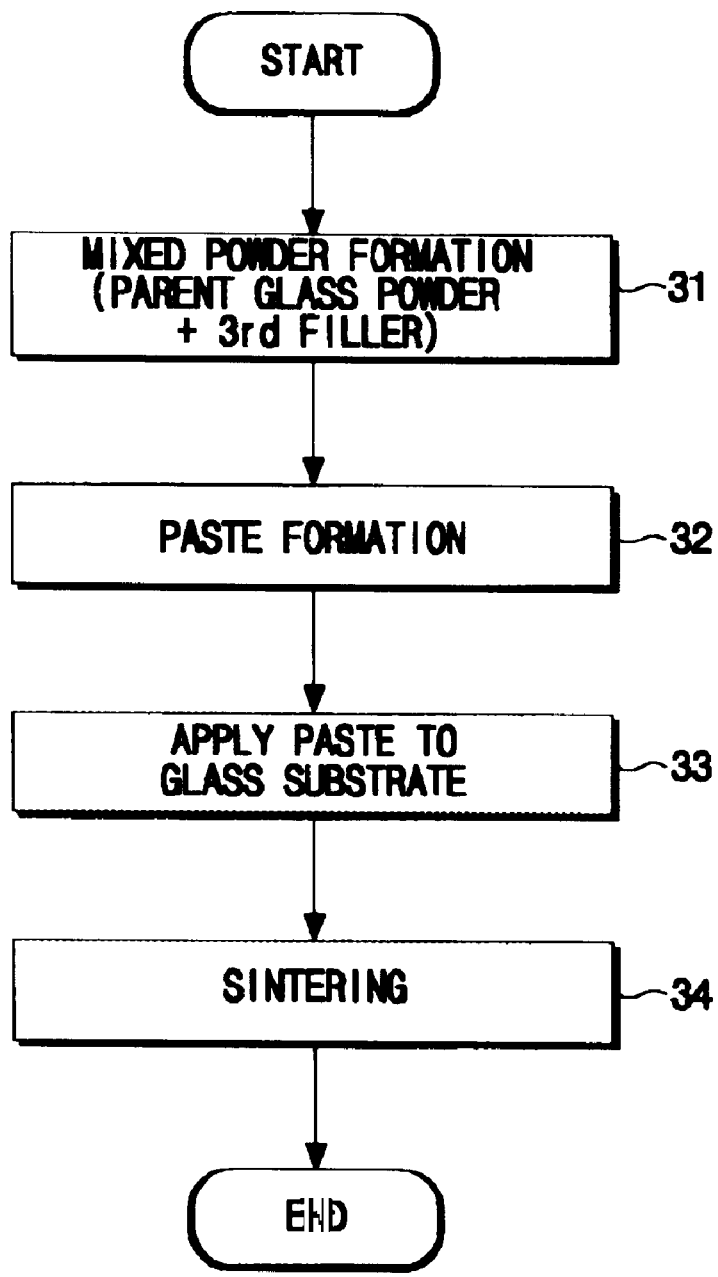
FIG. 5 is a flow chart showing a manufacturing method of a dielectric layer for the purpose of explaining a dielectric composition for a plasma display panel according to a fourth embodiment of the present invention.

Referring to FIG. 5, there are explained a method for manufacturing a dielectric layer for a plasma display panel according to the fourth embodiment of the present invention step by step. In step 31, the third filler powder is mixed with the $SiO_2$—$ZnO$—$B_2O_3$ group glass powder to form a mixed powder. Herein, the $SiO_2$—$ZnO$—$B_2O_3$ group glass powder is prepared in the same manner as explained with reference to FIG. 2. Then, the third filler powder having a component ratio in Table 7 is mixed with the $SiO_2$—$ZnO$—$B_2O_3$ group glass powder to form a mixed powder. A mixed powder composition made by mixing the $SiO_2$—$ZnO$—$B_2O_3$ group glass powder with the third filler powder is applicable to the lower dielectric layer and the barrier rib.

In step 32, a paste is prepared by mixing the mixed powder with an organic vehicle at a desired ratio. Herein, the mixed powder means a mixture of the $SiO_2$—$ZnO$—$B_2O_3$ group glass powder and the third filler powder. An explanation as to the process of forming the paste is omitted because it has already been done with reference to FIG. 2.

Subsequently, the paste is printed on the glass substrate in step 33 and then is sintered for a desired time at a desired temperature in step 34. An explanation as to the printing and sintering process is omitted because it has already been done with reference to FIG. 2.

Meanwhile, the following Table 8 represents a characteristic of the dielectric layer made by adding the third filler to the $SiO_2$—$ZnO$—$B_2O_3$ group glass in the above-mentioned manner.

TABLE 8

Characteristic of the dielectric layer made by adding the third filler to the $SiO_2$-$ZnO$-$B_2O_3$ group glass

| | |
|---|---|
| DIELECTRIC CONSTANT (1Mhz) | 7–10 |
| RESISTING VOLTAGE (KV) | 1.5–2.0 |
| THERMAL EXPANSIVE COEFFICIENT ($10^{-7}/°$ C.) | 79–89 |
| SINTERING TEMPERATURE (° C.) | 550–660 |
| SURFACE LUMINANCE (100 μm, Å) | 2500–5000 |
| REFLECTIVITY (400 nm, %) | 50–60 |

The dielectric layer formed in a manner as described above has a relatively low dielectric constant of 7 to 10 to thereby reduce a delay of addressing time and improve a surface luminance and a reflectivity of the dielectric layer. Also, the dielectric layer does not include PbO, so that its weight becomes light to improve a reflectivity of the dielectric layer.

Fifth Embodiment

In the fifth embodiment of the present invention, a dielectric layer is formed by mixing a glass powder of $P_2O_5$—$ZnO$—$BaO$ group with the fourth filler powder(i.e., Oxide powder). The following Table 9 shows a composition ratio of the fourth filler powder. A composition in Table 9 is given assuming the weight of a $P_2O_5$—$ZnO$—$BaO$ group glass to be 100 weight percent.

TABLE 9

Type and Component ratio of the fourth filler powder

| FILLER | $TiO_2$ | $\alpha$-$Al_2O_3$ | $V_2O_5$ | $ZrO_2$ |
|---|---|---|---|---|
| WEIGHT % | 3–25 | 5–20 | 2–15 | 2–20 |

In connection with the fourth filler to be mixed with the $P_2O_5$—$ZnO$—$BaO$ group glass, if $TiO_2$ of 3 to 25 weight % is mixed with the glass, then a reflectivity and a crystallinity of the dielectric layer is improved. On the other hand, if $V_2O_5$ of 2 to 15 weight % or $ZrO_2$ of 2 to 20 weight % is mixed with the glass, then a crystallinity of the dielectric layer is improved. Further, if $\alpha$-$Al_2O_3$ of 5 to 20 weight % is mixed with the glass, then a dielectric layer having a low thermal expansive coefficient is formed. More specifically, a thermal expansive coefficient of the glass is $10 \times 10^{-7}/°$ C. and a thermal expansive coefficient of $\alpha$-$Al_2O_3$ is $66 \times 10^{-7}/°$ C. Since a thermal expansive coefficient of the dielectric layer made by mixing $\alpha$-$Al_2O_3$ with the glass is 85 to $90 \times 10^{-7}/°$ C. which approximates a thermal expansive coefficient of glass plate(i.e., soda-lime glass), 83 to $85 \times 10^{-7}/°$ C., a surface luminance of the dielectric layer is improved. The dielectric layer may be formed by mixing all of $TiO_2$, $\alpha$-$Al_2O_3$, $V_2O_5$ and $ZrO_2$ with the glass. Alternatively, the dielectric layer may be formed by selectively adding at least one of $TiO_2$, $\alpha$-$Al_2O_3$, $V_2O_5$ and $ZrO_2$ to the glass depending on characteristics required for the dielectric layer.

Referring now to FIG. 6, there are explained a method for manufacturing a dielectric layer for a plasma display panel according to the fifth embodiment of the present invention step by step. In step 41, the fourth filler powder is mixed with the $P_2O_5$—$ZnO$—$BaO$ group glass powder to form a mixed powder. Herein, the $P_2O_5$—$ZnO$—$BaO$ group glass powder is prepared in the same manner as explained with reference to FIG. 2. Then, the fourth filler powder having a component ratio in Table 9 is mixed with the $P_2O_5$—$ZnO$—$BaO$ group glass powder to form a mixed powder. A mixed powder composition made by mixing the $P_2O_5$—$ZnO$—$BaO$ group glass powder with the fourth filler powder is applicable to the lower dielectric layer and the barrier rib.

In step 42, a mixed powder paste is prepared by mixing the mixed powder with an organic vehicle at a desired ratio. Herein, the mixed powder means a mixture of the $P_2O_5$—$ZnO$—$BaO$ group glass powder and the third filler powder. An explanation as to the process of forming the paste is omitted because it has already been done with reference to FIG. 2.

Subsequently, the paste is printed on the glass substrate in step 43 and then is sintered for a desired time at a desired temperature in step 44. An explanation as to the printing and sintering process is omitted because it has already been done with reference to FIG. 2.

Meanwhile, the following Table 10 represents a characteristic of the dielectric layer made by adding the fourth filler to the $P_2O_5$—$ZnO$—$BaO$ group glass in the above-mentioned manner.

TABLE 10

Characteristic of the dielectric layer made by adding the fourth filler to the $P_2O_5$-$ZnO$-$BaO$ group group glass

| | |
|---|---|
| DIELECTRIC CONSTANT (1Mhz) | 7–10 |
| RESISTING VOLTAGE (KV) | 1.5–2.0 |

TABLE 10-continued

Characteristic of the dielectric layer made by adding the fourth filler to the $P_2O_5$-ZnO-BaO group group glass

| | |
|---|---|
| THERMAL EXPANSIVE COEFFICIENT ($10^{-7}/°$ C.) | 83–92 |
| SINTERING TEMPERATURE (° C.) | 510–530 |
| SURFACE LUMINANCE (100 μm, Å) | 1500–3500 |
| REFLECTIVITY (400 nm, %) | 50–60 |

The dielectric layer formed in a manner as described above has a relatively low dielectric constant of 7 to 10 to thereby reduce a delay of addressing time and improve a surface luminance and a reflectivity of the dielectric layer. Also, the dielectric layer does not include PbO, so that its weight becomes light. Furthermore, a thermal expansive coefficient of the dielectric layer approximates that of the glass substrate by mixing the fourth filler with the glass, thereby preventing a crack of the dielectric layer.

As described above, the dielectric composition for the plasma display panel according to the present invention has advantages in that the optical, thermal and electrical characteristic requirements in the dielectric layer can be met and that a weight of the dielectric layer becomes light.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. For example, the $SiO_2$—ZnO—$B_2O_3$ group glass or the $P_2O_5$—ZnO—BaO group glass may be used as a dielectric composition in the embodiments of the present invention. Also, the first to third fillers may be selectively added to the $SiO_2$—ZnO—$B_2O_3$ group glass and the fourth filler may be selectively added to the $P_2O_5$—ZnO—BaO group glass, depending on characteristic requirements in the dielectric layer. Accordingly, the scope of the invention shall be determined only by the appended claims and their equivalents.

What is claimed is:

1. A dielectric composition for a plasma display panel comprising:

a glass of a $SiO_2$—ZnO—$B_2O_3$ group; and a filler having a melting point below 580° C., wherein the dielectric composition is at least any one of a plasma display panel upper dielectric layer, lower dielectric layer and a barrier rib.

2. The dielectric composition as claimed in claim 1, wherein the glass of $SiO_2$—ZnO—$B_2O_3$ group comprises of ZnO of 25 to 45 weight %, PbO of 3 to 40 weight %, $SiO_2$ of 15 to 25 weight %, $B_2O_3$ of 12 to 25 weight %, $K_2O$ of 2 to 10 weight %, $Na_2O$ of 2 to 8 weight %, $Al_2O_3$ of 1 to 7 weight %, $Li_2O$ of 1 to 5 weight %, and CaO of 1 to 5 weight %.

3. The dielectric composition claimed in claim 1 wherein the filler includes at least any one of LiI, $LiNO_3$, $NaNO_3$, $KIO_3$, $KNO_3$, $CaI_2$ and $B_2O_3$, each of which is 1 to 20 weight %.

4. A dielectric composition for a plasma display panel, comprising:

a glass of a $SiO_2$—ZnO—$B_2O_3$ group;

a first filler having a refractive index above 2 and a melting point above 800° C.; and a second filler having a melting point below 580° C. wherein the dielectric composition is any one of a plasma display panel upper dielectric layer, a lower dielectric layer and a barrier rib.

5. The dielectric composition as claimed in claim 4, wherein the glass of $SiO_2$—ZnO—$B_2O_3$ group comprises of ZnO of 25 to 45 weight %, PbO of 3 to 40 weight %, $SiO_2$ of 15 to 25 weight %, $B_2O_3$ of 12 to 25 weight %, $K_2O$ of 2 to 10 weight %, $Na_2O$ of 2 to 8 weight %, $Al_2O_3$ of 1 to 7 weight %, $Li_2O$ of 1 to 5 weight %, and CaO of 1 to 5 weight %.

6. The dielectric composition as claimed in claim 4 wherein the first filler includes at least any one of $TiO_2$, $ZrO_2$, SiC, Si, $BaTiO_3$, $CaTiO_3$, $LiNbO_3$, NiO, MnO, ZnO, $Bi_2O_3$, and SiO each of which is 4 to 30 weight %.

7. The dielectric composition claimed in claim 4 the second filler includes at least any one of LiI, $LiNO_3$, $NaNO_3$, $KIO_3$, $KNO_3$, $CaI_2$ and $B_2O_3$, each of which is 1 to 20 weight %.

8. A dielectric composition for a plasma display panel comprising:

a glass of a $SiO_2$—ZnO—$B_2O_3$ group, comprising ZnO of 25 to 45 weight %, PbO of 3 to 40 weight %, $SiO_2$ of 15 to 25 weight %, $B_2O_3$ of 12 to 25 weight %, $K_2O$ of 2 to 10 weight %, $Na_2O$ of 2 to 8 weight %, $Al_2O_3$ of 1 to 7 weight %, $Li_2O$ of 1 to 5 weight %, CaO of 1 to 5 weight %; and a filler of oxide powder wherein the filler includes at least any one of $TiO_2$ of 3 to 25 weight %, $AlPO_4$ of 5 to 30 weight percent, $P_2O_5$ of 5 to 30 weight %, $V_2O_5$ of 2 to 15 weight % and $ZrO_2$ of 2 to 20 weight %.

9. The dielectric composition as claimed in claim 8 wherein the dielectric composition is at least any one of a plasma display upper dielectric layer, a lower dielectric layer and a barrier rib.

10. A dielectric composition for a plasma display panel, comprising:

a glass of an $SiO_2$—ZnO—$B_2O_3$ group comprising ZnO of 25 to 45 weight %, PbO of 3 to 40 weight %, $SiO_2$ of 15 to 25 weight %, $B_2O_3$ of 12 to 25 weight %, $K_2O$ of 2 of 10 weight %, $Na_2O$ of 2 to 8 weight %, $Al_2O_3$ of 1 to 7 weight %, $Li_2O$ of 1 to 5 weight %, CaO of 1 to 5 weight %; and a filler having a melting point below 580° C.

11. A dielectric composition for a plasma display panel, comprising:

a glass of a $SiO_2$—ZnO—$B_2O_3$ group comprising ZnO of 25 to 45 weight %, PbO of 3 to 40 weight %, $SiO_2$ of 15 to 25 weight %, $B_2O_3$ of 12 to 25 weight %, $K_2O$ of 2 to 10 weight %, $Na_2O$ of 2 to 8 weight %, $Al_2O_3$ of 1 to 7 weight %, $Li_2O$ of 1 to 5 weight %, CaO of 1 to 5 weight %;

a first filler having a refractive index above 2 and a melting point above 800° C.; and a second filler having a melting point below 580° C.

* * * * *